C. F. JOHNSON, Jr.
Steam-Plow.
No. 49,761. Patented Sept. 5, 1865.
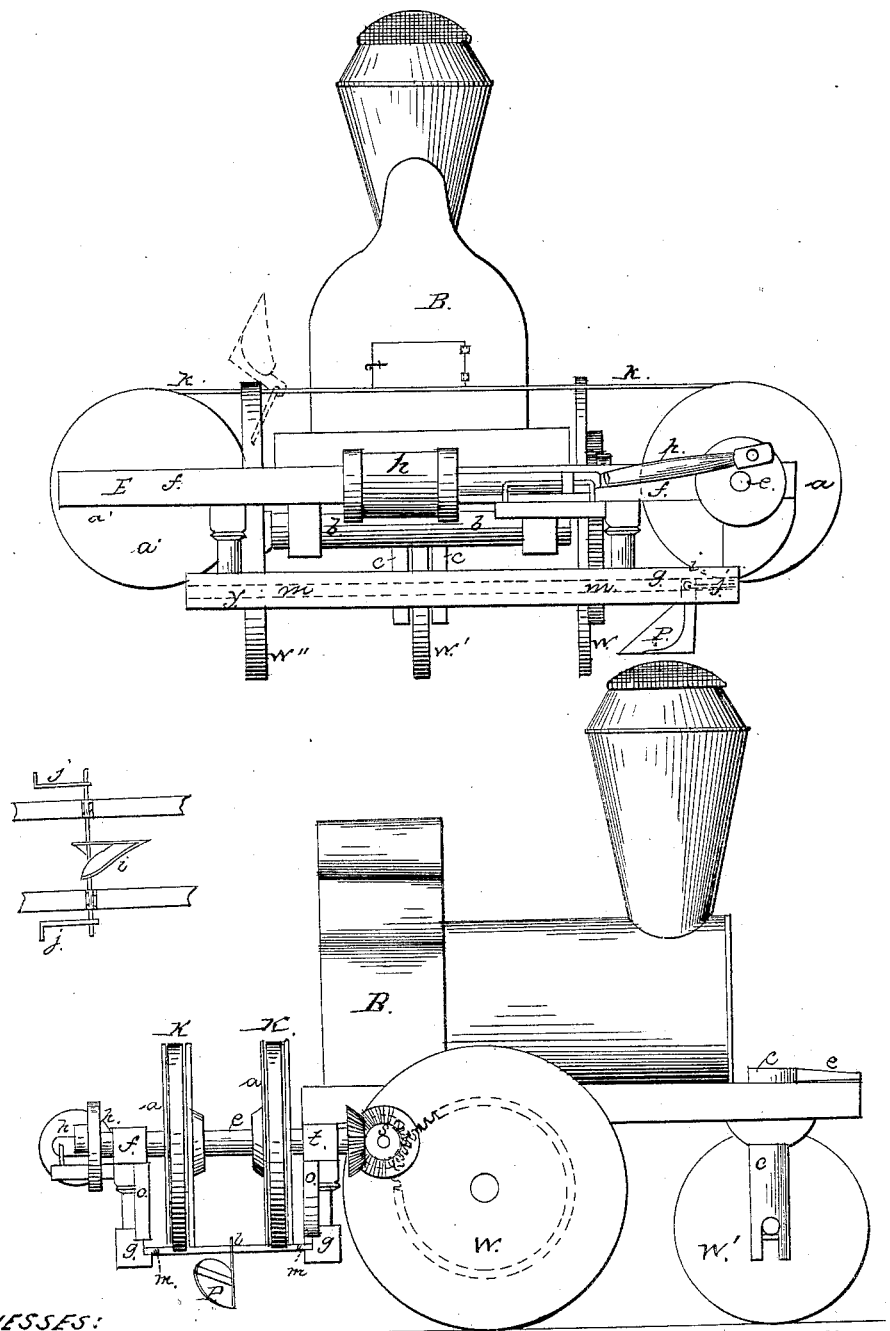
WITNESSES:
INVENTOR:

UNITED STATES PATENT OFFICE.

CHARLES F. JOHNSON, JR., OF OWEGO, NEW YORK.

IMPROVEMENT IN STEAM-PLOWS.

Specification forming part of Letters Patent No. 49,761, dated September 5, 1865.

*To all whom it may concern:*

Be it known that I, CHARLES F. JOHNSON, Jr., of Owego, in the county of Tioga and State of New York, have invented a new and useful Machine for the Purpose of Plowing Ground by Steam-Power; and I do hereby declare that the following ia a full, clear, and exact description of the construction and operation of the same, reference being had to the annexed drawings.

The machine consists of a steam-boiler, B, hung in a frame and mounted on three wheels, the plow-frame running across the rear of the machine, the draft-wheels, guides, chains, plows, and engine thereto attached, and hereinafter described.

On Sheet 1 is represented a rear elevation of my machine. On Sheet 2 is represented a side elevation and also a plan of the plow, having the cross-head and a portion of the straps or chain attached.

The entire machine rests on three wheels, $w$ $w'$ $w''$. The wheels $w$ $w''$ are attached to the same axle $b$, which turns in boxes under the main frame of the machine. The wheel $w'$ turns on its axis, which axis is set in a standard or upright post, $c$, which can be turned by means of the handle $d$. This wheel is so hung for the purpose of enabling the machine to be guided or turned. These three wheels then admit of the forward motion of the machine, and are for that purpose exclusively.

The method by which motive power is applied for the purpose of locomotion will be explained subsequently.

The method of plowing or turning over the ground is as follows: Attached to the rear of the machine is a frame, $f f$, the sides of which are parallel to the axis of the wheels $w$ $w''$, and also, of course, parallel to the plane of the ground over which the machine moves. In the frame are hung two shafts, E, one at each extremity of the frame, and square across it. The end of only one of these shafts is represented on Sheet 1, as the other does not project through the frame. It lies in the center of the wheel $a'$. On Sheet 2 only one of these shafts is represented at E, the other being directly in line behind it and concealed by it. To each of these shafts, inside of the frame, are firmly keyed two wheels, $a$ $a'$. On Sheet 2 only the wheels on one shaft are visible, the others being directly in line behind, and on Sheet 1 one of each pair is shown, $a a'$. These wheels I denominate "draft-wheels," since their office is to draw the plows by means of the chain, hereinafter described. In the periphery of these wheels a groove is turned, deep enough to admit a strap or belt which passes over each wheel and the corresponding one on the other shaft, as shown at $k$ $k$, and connects them together.

The shaft of the wheel $a$ is rotated by an ordinary horizontal steam-engine lying on the outside of the frame $f f$, the wheels $a$ forming the balance-wheel of the engine.

The steam-cylinder, piston-rod, connecting-rod, and crank are represented at $h$ $h$. The steam-boiler is represented at B.

Directly below the frame $f f$, and attached to it by upright pieces, are two bars, parallel to the frame and to each other, (shown at $g$ $g$.) Running the entire length on the inside of these bars are two parallel grooves, to admit the head of the cross-head hereinafter mentioned. These grooves are shown at $m$ $m$ in Sheet 2, and the line of them is indicated by the dotted lines $m$ $m$ in Sheet 1, and is exactly opposite and parallel to the belt or straps before spoken of.

The plows are attached to the belt by the cross-bar $i$, which passes through or is otherwise attached to the belts, but is free to turn in the belt on its longitudinal axis. (See small figure, Sheet 2.) To this bar are rigidly attached projecting pieces $j$ $j$, the ends of which are turned outward and project as far as the extremity of the bar. The beam of the plow is rigidly attached to the cross-bar. This cross-bar and attachments I denominate the "cross-head," the object and use of it being to guide and steady the plow, the ends of the bar and the ends of the projecting pieces running in the parallel grooves before referred to.

The motion of the plow is as follows: Supposing the shaft E to be rotated by the engine, and the cross-head and plow to be in the position represented in Sheet 1 at $p$, $i$, and $j$, the ends of the cross-head being in the grooves $m$ $m$, the cross-head will be drawn squarely and steadily forward by the straps. The cross-head and plow being drawn as above explained, and the plow being at the required depth in the ground, the plow will turn a furrow over toward the back of the machine. The plow is thus drawn till it reaches a point under the center of the wheel $a'$. The ends of the cross-head pass out of the grooves $m\ m$, the cross-bar follows around on the circle of the wheel $a'$. As the cross-bar begins to rise on the circle it will lift up the back part of the plow. The projecting pieces on the cross-bar will rise outside of the wheels between them and the frame, and the plow will be drawn out of the ground backward, swinging freely. The plow will then be carried over by the straps till it reaches the other wheels, $a$. When the point of the plow strikes the ground it will be held till the projecting pieces on the cross-head strike on the circular projections or guides (represented at $o\ o$) attached to the parallel bars. The plow will then be forced into the ground, and the ends of the cross-head will follow round into the grooves to repeat their journey.

Notches should be made in the periphery of the wheels to admit the cross-bar and prevent the strap from slipping. These straps should be made of links of iron and connected with cross-bars at regular intervals, which cross-bars should fit into notches in the periphery of the draft-wheels. This device would keep the two straps even; and I claim as one patentable point in my invention making these draft-wheels and straps double, so as to draw the plow from two points. If only one strap were used the cross-head might twist and become jammed in the grooves. It is also evident that at least two plows should be used, that one may enter the ground as soon as the other leaves it. The frames and bars should all be made of wrought-iron and the wheels of cast-iron or other suitable material.

The machine is moved slowly forward at the same time that the plows are making the cross-motion before referred to. Suppose two plows only are used, and that each cuts a furrow one foot wide, then it is evident that the machine must move forward two feet while the plows make an entire revolution—i. e., pass from a certain point through the ground, over the wheels, and back to the exact point from which they started—because during that time each plow has cut one furrow a foot wide across behind the machine.

The method of locomoting the machine is simply by rotating the wheels $w\ w''$ by means of the shaft S, which gears with a spur-gear into a gear on the wheel $w$, and with a bevel-gear into the engine-shaft E. No specific proportions can be given for these gears, since their proportionate diameters evidently depend upon the number of plows used, the width of furrow, the length of furrow, and the diameter of the driving-wheels. The rule might be stated in general terms that the periphery of the driving-wheels must move a distance equal to the width of the furrow during the time that one of the plows moves the distance between it and the next plow on the belt. It is evident, also, that the flat landside of the plow (if a plow of the ordinary construction is used) would oppose resistance to the forward motion of the machine while it was in the ground.

The mold-board of the plow, I should remark, is turned toward the back of the machine. This difficulty can be overcome in practice by setting the plane of the landside of the plow at a slight angle to the guides in which the cross-head moves, (the point toward the front of the machine,) so that it will have a tendency to run toward the front of the machine. This angle depends evidently on the width of the furrow, the length of the furrow, and the number of plows, but may be generally stated thus: Divide the width of the furrow by the length and multiply by the number of plows. The fractional result will be the ratio of the incline. Thus, suppose the width of the furrow to be one foot, the length nine feet, and the number of plows two, the incline will then be two-ninths, or two inches in nine, and a plow set at this angle to the guides will oppose no resistance to the forward motion of the machine.

Two different plans have hitherto been tried in this country and in England for applying steam-power to plowing. The first is using a stationary engine, which draws a gang of plows forward and back across the field by means of a cable and pulleys. The disadvantages of this plan are that it requires not less than five hands to manage it, and that a considerable amount of power is necessarily lost in the friction of the ropes, and the fact that the power is at some distance from the work. It is known as "Fowler's" plan, and is extensively used in England and on the continent. I claim that one or, at most, two men can work my machine, and also that it can be worked in the night easier than Fowler's machine. The second plan hitherto tried is to use the steam-engine directly as a locomotive, attach behind it a gang of plows, and draw them directly across the field. The difficulty attending this plan is that it is impossible to prevent the wheels from slipping or turning on the ground. The resistance they offer to the ground must be greater than the resistance of the plows, which it is intended to draw. This resistance can only be obtained by making the machine very heavy, but then a great portion of the effective power of the machine is consumed in merely moving it. So great are these difficulties that, although numerous and costly expermients have been made both here and abroad, they have hitherto been unsuccessful in producing a machine which shall work cheaply.

Now, in my plan the engine draws the plows directly. They are not drawn through the medium of the driving-wheels. Consequently there is no danger of the driving-wheels turning or slipping on the ground. Again, the frame in which the plows run can be made quite long, so as to plow a wide belt of land. Suppose this frame to be sixteen and one-half feet long, then moving the machine forward half a mile would leave one acre plowed. To accomplish this much plowing in an hour would in ordinary land necessitate the expenditure of seven horse-power, according to experiments. To move the machine one-half mile forward in the same time would not require an expenditure of to exceed two horse-power. The machine can be brought within the weight of five tons. If seven-ninths of the effective power of the steam is utilized in turning over the ground, it will be a better result than has ever been obtained before.

In describing my machine I have called it a "steam-plow," and have spoken of the tool which cultivates and turns over the ground as a "plow;" but I do not wish to confine myself in practice to the use of a plow. Other instruments for the purpose of stirring or comminuting the soil could be used—such as rotary diggers, rakes, cultivators, &c.—in lieu of a plow. Again, since the plows in my machine are confined in guides, so as to run true and even, it is evident that the landside, the only use of which is to guide the plow in the ground, could be dispensed with. This would greatly decrease the friction of the plow in the ground. Again, as I contemplate running the plows at a high speed—say six or seven miles an hour—the shape would have to be materially modified from the ordinary shape of a plow, in order to produce the proper action on the ground.

The points which I claim to be new and of my invention, and which I desire to secure by Letters Patent, are as follows:

1. The plow, running at right angles, or nearly so, to the forward motion of the machine, in connection with the grooves or guides, substantially as described.

2. The plow rotating on an axis, so as to be easily withdrawn from the ground when the stroke is finished and again presented in a position to enter the ground.

3. The guides or grooves and the cross-head, for the purpose of steadying the plow, as described.

4. The arrangement of the guides and the cross-head, by which the back of the cross-head, after emerging from the guides or grooves, can rise and allow the plow to turn up endwise and be withdrawn from the ground, in the manner described.

CHARLES F. JOHNSON, Jr.

Witnesses:
E. BEEMAN,
J. C. PUMPELLY.